July 5, 1927.
E. R. NEWTON
POWER PLANT
Filed Feb. 18, 1920
1,634,797
2 Sheets-Sheet 1
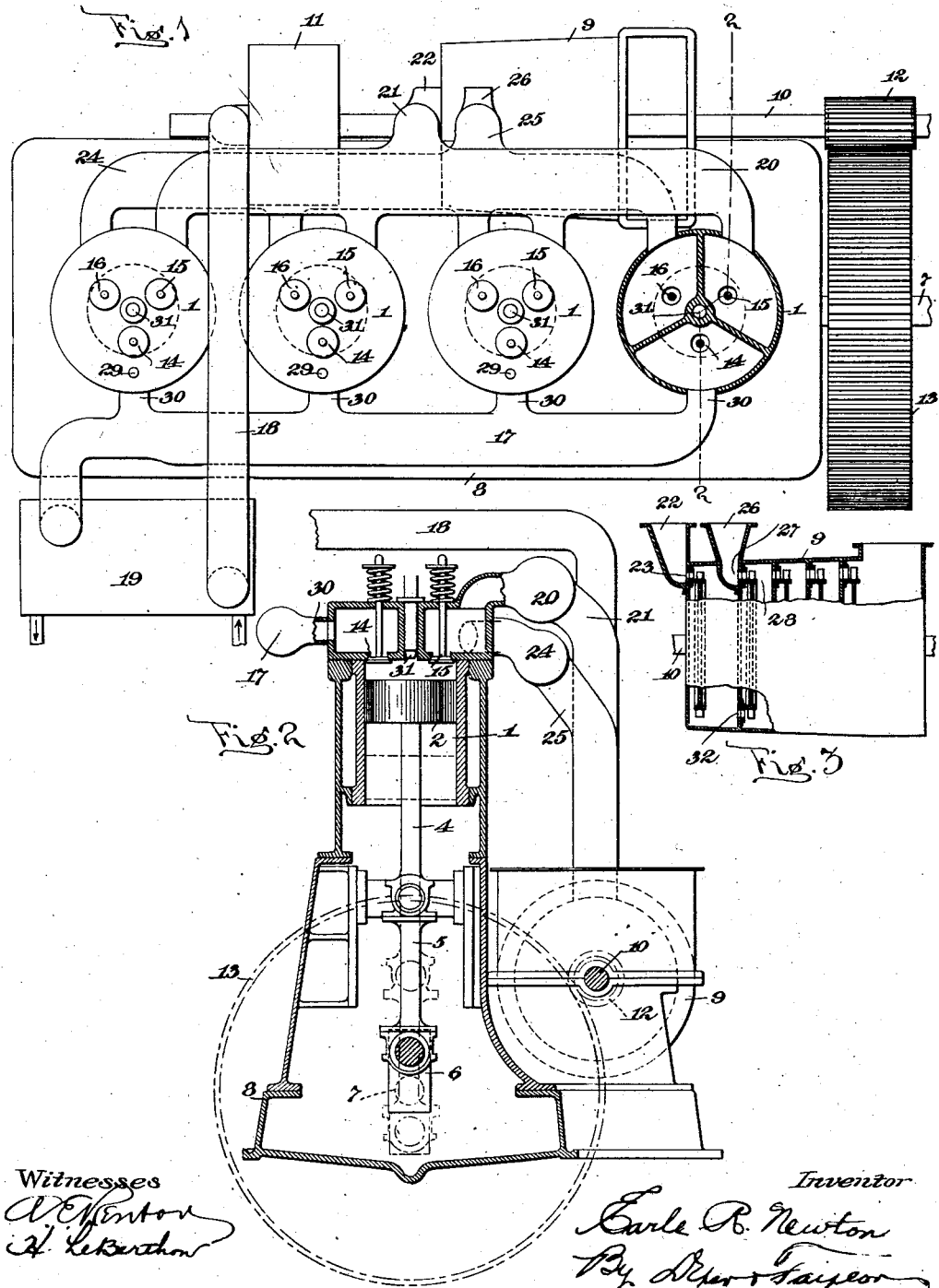

July 5, 1927.
E. R. NEWTON
POWER PLANT
Filed Feb. 18, 1920
1,634,797
2 Sheets-Sheet 2
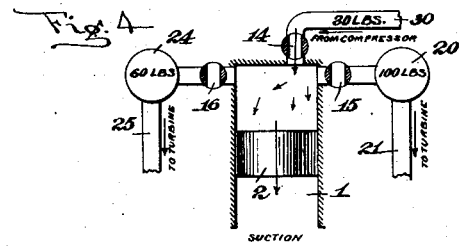
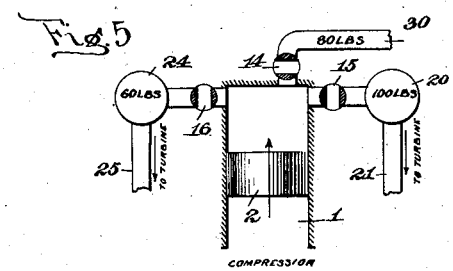
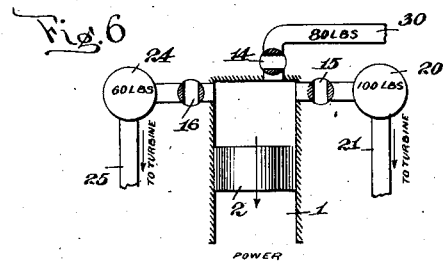
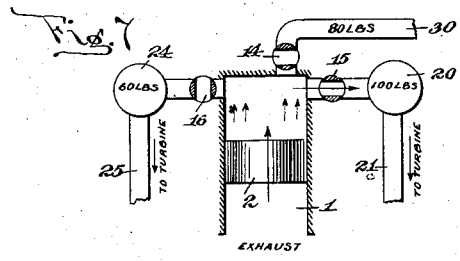
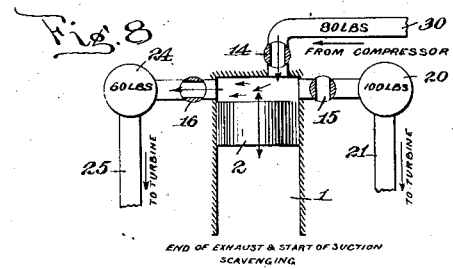

Patented July 5, 1927.

1,634,797

UNITED STATES PATENT OFFICE.

EARLE R. NEWTON, OF NEW YORK, N. Y., ASSIGNOR TO CURTIS GAS ENGINE CORPORATION, OF NEW YORK, N. Y., A CORPORATION OF NEW YORK.

POWER PLANT.

Application filed February 18, 1920. Serial No. 359,569.

The invention relates to power plants wherein products of combustion are employed as the working fluid, and more particularly to plants wherein an internal-combustion reciprocating engine is employed, in connection with an elastic fluid turbine in which the products of combustion exhausting from the reciprocating engine are further expanded.

The objects of the invention are to provide means whereby the gases scavenged from the reciprocating engine may be utilized to perform useful work; and to provide a power plant capable of maintaining the high efficiency of the present day internal-combustion engine, while the power developed for a given size of engine is greatly increased.

These and further objects will more fully appear in the following specification and accompanying drawings considered together or separately.

One embodiment of the invention is illustrated in the accompanying drawings, in which like parts in all of the several figures are designated by corresponding characters of reference, and in which Fig. 1 is a diagrammatic top plan view of a four cylinder internal-combustion engine provided with the invention.

Fig. 2 is a sectional elevation on the line 2—2 of Fig. 1.

Fig. 3 is a side elevation of an elastic fluid turbine partly in section.

Figs. 4, 5, 6, 7 and 8 are diagrams illustrating steps in the operations.

The present day internal combustion engine is highly efficient, but its field of application is limited to comparatively small horsepower, due to practical limitations of the size of the cylinders, great weight, and high cost. For good efficiency, high pressures and temperatures are necessary, and this means heavy and expensive parts.

In order to efficiently utilize the high pressure and high temperature, a large expansion ratio must be provided for, and this necessitates long cylinders, long stroke, and comparatively slow revolutions for a safe piston speed.

Without this large expansion ratio the volume change in the cylinder will not be sufficient to expand the hot products down to anything like atmospheric pressure, and a large proportion of the energy will be wasted in the exhaust.

Further, in the explosion type of engine there is a limitation to permissible compression. The temperature of compression must be kept below the point at which the injected fuel will ignite, and this limits the possible efficiency of the engine. Practically, the temperature must be kept down to that resulting from a compression of approximately 250 pounds.

According to the present invention a reciprocating internal-combustion engine having a comparatively small expansion ratio in the cylinder is employed. The cylinder is supplied with air under pressure from an independent source. Further compression to any degree desired is effected within the cylinder. Fuel is burned or exploded. The products of combustion are expanded within the cylinders through a ratio corresponding to the stroke, and are then admitted to an elastic fluid turbine in which the expansion to atmospheric pressure is completed.

The products of combustion exhausting from the cylinder are admitted to two points in the turbine expansion successively. The larger portion of the products of combustion is directed to one point in the turbine expansion, and the smaller portion, i. e. the scavenging or residual portion, is directed to another point in the turbine expansion. This is to insure as complete scavenging of the cylinders as possible, and to avoid the necessity of discharging a portion of the gases directly to the atmosphere, and causing a loss of energy.

By cooling the compressed air supplied to the cylinder, it is possible to materially raise the final compression pressure without raising the final temperature of compression above that ordinarily used. This permits the use of a higher compression in an explosion type of engine without the danger of preigniting the fuel. It also results in a higher working pressure with a given maximum temperature, and a corresponding higher output. The cooling of the air does not constitute a necessary part of the invention, and that step may be omitted if desired.

The invention is illustrated and described in connection with a four cylinder, four cycle reciprocating engine. It is to be understood that an engine having any desired number of cylinders may be employed.

The turbine illustrated is of the Curtis impulse wheel type, but any other suitable type of turbine may be employed.

In carrying out the invention a reciprocating internal combustion engine is employed, having explosion or combustion cylinders 1, pistons 2, piston rods 4, connecting rods 5, cranks 6 and shaft 7. The engine parts are supported in a base 8.

The cylinders 1 are designed to operate with a substantially reduced number of expansions as compared to cylinders at present used. This is accomplished by materially increasing the clearance space in comparison with the length of stroke. In the present type of internal combustion engine the clearance space is approximately one twelfth of the stroke.

In the drawings of this application a clearance space equal to one fourth of the stroke is illustrated. Such a construction will expand the gas to five times its original volume. Since the expansion in the cylinders has been materially reduced it will not be possible to carry out the full compression in the cylinders. The air must, therefore, be partially compressed in another piece of apparatus.

Supported on the base 8 is an elastic fluid turbine 9, the shaft 10 of which is parallel to the shaft 7. Carried on the shaft 10 is a turbo-compressor 11, and the shafts 7 and 10 are geared together by means of a pinion 12 and a spur gear 13.

Each cylinder is provided with an inlet valve 14, and two exhaust valves 15 and 16. The chest of each inlet valve 14 communicates with a manifold 17 which in turn is connected through a pipe 18 with the outlet of the air compressor 11. Preferably the pipe 18 passes through a cooler 19 whereby heat due to compression is withdrawn from the air in the pipe. The cooler 19 may be of any preferred type.

The chests of the valves 15 of all of the cylinders communicate with a manifold receiver 20, which in turn exhausts through a pipe 21 into the bowl 22 of the nozzle 23 of the first stage of the turbine 9.

The chests of the valves 16 of all of the cylinders 1 communicate with a manifold receiver 24, and the contents of said receiver are delivered through a pipe 25 to the bowl 26 of the nozzle 27 of a stage 28 of the turbine. The stage 28 is illustrated as the second stage of the turbine, but it is to be understood that it may be any stage after the first.

Fuel may be admitted to the chests of the valves 14 in any desired manner, as at 29 or the same may be admitted to the manifold 17 or into the branches 30 leading to the valve chests, The fuel may be ignited by means of spark plugs 31 or in any other suitable manner.

While a rotary air compressor driven by the turbine shaft is illustrated, it is to be understood that other forms of compressor may be used, and that the compressor may be driven in any desired manner.

The operation is as follows:—

The air from the compressor 11 is fed by the pipe 18, through the cooler 19 and into the manifold 17 where it is distributed by the branches 30 to the chests of the valves 14. These valves close at the end of the suction stroke. Further compression of the air is accomplished in the cylinders 1 on the next up or compression stroke. Fuel is now burned or exploded in the cylinders and expansion takes place on the down or power stroke. At the beginning of the exhaust stroke, when the pistons move upward after the power stroke, the valves 15 open and the products of combustion are delivered to the manifold receiver 20 from which they are delivered through the branch pipes 21 and bowls 22 to the nozzles 23 of the first stage of the turbine 9. The fluid after passing through the wheel or wheels of the first stage of the turbine will pass through nozzles 32 and pass through all of the succeeding stages and is expanded to atmosphere.

As the piston approaches the end of the exhaust stroke, the valves 15 close and the valves 14 and 16 open, and the products of combustion remaining in the cylinder and which I term the residual exhaust gas, are swept therefrom, by the air entering through the valve 14, into the manifold-receiver 24 whence they are distributed, by means of the branches 25 and bowls 26 to the nozzles 27 to the second stage 28 of the turbine 9, in which expansion to atmosphere is completed. This operation effectually scavenges the cylinders, and all of the products of combustion produce useful work in the turbine in expanding to atmosphere. The scavenging is, by reason of the sweeping of the fresh air through the clearance space at the top of the cylinder, carried out to a greater extent than heretofore.

When all of the products of combustion have been driven out of the cylinder 1 the valves 16 close, but the valves 14 remain open during the down or suction stroke, and the cylinders are charged with fresh air and fuel for the following cycles.

The power developed in the turbine, above that required to operate the compressor, is transmitted to the shaft 7 of the reciprocating engine through the gear 12—13.

The valves 14, 15 and 16 may be operated in any desired manner as by cam mechanism (not shown) operated from the shaft 7 as is common.

In Figs. 4, 5, 6, 7 and 8 the cycle of operation is illustrated in diagrammatic form.

Valves having an arrow through them are open and those minus the arrows are closed, it being understood that fuel is introduced and burned, or exploded, between the compression and power strokes.

During the first down stroke of the piston 2, the suction stroke (Fig. 4), the valve 14 admits air from the compressor, and charges the cylinder 1 at say 75 pounds pressure, the valves 15 and 16 being closed.

During the following up stroke, the compression (Fig. 5), the air is compressed to say 500 pounds, the valves 14, 15 and 16 being closed. Ignition takes place when the piston reaches its upper limit, the gases are expanded down to say 100 in forcing the piston down during the power stroke (Fig. 6).

During the following up stroke, the exhaust stroke (Fig. 7), the valve 15 is open and the burned products at 100 pounds pressure are discharged into the manifold-receiver 20, and thence to the first stage of the turbine.

As the piston 2 nears the top of the exhaust stroke the valve 15 closes and the valves 14 and 16 open (Fig. 8), and the products of combustion not expelled through the valve 15 before it is closed, are driven by the inrushing air from the compressor into the manifold-receiver 24 where it is maintained at an average pressure of say 60 pounds, and is delivered thence to the stage 28 of the turbine.

When the scavenging has been completed, the valve 16 closes, but the valve 14 remains open during the suction stroke Fig. 4.

This describes the operation of a single cylinder. By multiplying the cylinders, and arranging them to discharge successively into manifold-receivers 20 and 24 as above described, it is evident that a fairly uniform pressure may be maintained in the receivers, and a fairly constant supply of fluid to the turbine will result.

The expression "number of points in the turbine expansion" is intended to mean two or more points.

Instead of employing a separate set of nozzles, as 27, the products of the combustion from the manifold-receiver 24 may be directed into the turbine casing without the intermediary of such nozzles, at any point of the turbine expansion lower in pressure than that at which the products from the manifold-receiver 20 are admitted.

Other forms of secondary expansion apparatus than the turbine illustrated may be used if desired.

In accordance with the provisions of the patent statutes the principle of the invention has been described, together with the apparatus which is now considered to represent the best embodiment thereof, but it is understood that the apparatus shown is merely illustrative, and that the invention may be carried out in other ways.

Having thus described the invention what is claimed and desired to be secured by Letters Patent is:—

1. A compound power unit comprising a four cycle internal combustion engine of the type characterized by the cylinders of said engine being charged with precompressed air to a pressure substantially above normal atmospheric pressure, and a secondary expansion apparatus operating on the exhaust gas from said engine, means for so charging said cylinders, means for releasing exhaust gas from said cylinders at or near the end of the expansion strokes and at a pressure substantially above atmospheric pressure, means for driving out with precompressed air the gas remaining after the exhaust strokes at an approximately constant pressure substantially above atmospheric pressure, and means for utilizing the gas from said engine in said secondary apparatus by expansion to substantially atmospheric pressure.

2. A compound power unit according to claim 1, further including means for supplying the gas to said secondary apparatus at two approximately constant pressures both substantially above atmospheric pressure.

3. A compound power unit according to claim 1, said secondary apparatus being in the form of a turbine, and said combination further including means for supplying said gas to two points of the turbine expansion.

4. A compound power unit comprising a four-cycle internal combustion engine, an exhaust gas turbine and a rotary air compressor connected to said turbine, said compressor arranged to supply air to the cylinders of the engine at a pressure substantially above atmospheric pressure for scavenging and charging them, means for releasing exhaust gas from the cylinders at or near the end of the expansion strokes and at a pressure substantially above atmospheric pressure, means for driving out with said air the gas remaining at the end of the exhaust strokes at an approximately constant pressure substantially above atmospheric pressure, and means for utilizing the gas from said engine in said turbine by expansion to substantially atmospheric pressure.

5. A compound power unit according to claim 4, further including means for supplying the gas to said turbine at two approximately constant pressures both substantially above atmospheric pressure.

6. A compound power unit according to claim 4, further including means for supplying said gas to two points of the turbine expansion.

7. A compound power unit comprising a four-cycle engine operating on a superatmospheric cycle and a secondary expansion apparatus operating on the exhaust gas from the engine, means for driving out at an approximately constant superatmospheric pressure with precompressed air the gas remaining in the clearance space at the end of the exhaust strokes, and means for utilizing said gas by expansion to approximately atmospheric pressure in said secondary apparatus.

This specification signed this 14th day of February, 1920.

EARLE R. NEWTON.